(12) United States Patent
Hsih

(10) Patent No.: US 8,279,198 B2
(45) Date of Patent: Oct. 2, 2012

(54) RESISTIVE TOUCH PANEL

(75) Inventor: Lung-Sheng Hsih, Taipei (TW)

(73) Assignee: Minlead Ltd., Taipei (TW)

( * ) Notice: Subject to any disclaimer, the term of this patent is extended or adjusted under 35 U.S.C. 154(b) by 561 days.

(21) Appl. No.: 12/588,196

(22) Filed: Oct. 7, 2009

(65) Prior Publication Data
US 2010/0283755 A1 Nov. 11, 2010

(30) Foreign Application Priority Data

May 5, 2009 (TW) .............................. 98207595 U

(51) Int. Cl.
*G09G 5/00* (2006.01)
(52) U.S. Cl. .................. 345/174; 178/18.05; 178/18.06; 178/18.07; 345/173
(58) Field of Classification Search .................. 345/173, 345/174; 178/18.03, 18.04, 18.05, 18.06, 178/18.07
See application file for complete search history.

(56) References Cited

U.S. PATENT DOCUMENTS

| 6,483,498 | B1 * | 11/2002 | Colgan et al. ................. 345/173 |
| 6,727,895 | B2 * | 4/2004 | Bottari et al. ................. 345/174 |
| 6,841,225 | B2 * | 1/2005 | Bottari ......................... 428/192 |
| 7,499,038 | B2 * | 3/2009 | Nishikawa et al. ........... 345/174 |
| 7,777,733 | B2 * | 8/2010 | Yamamoto et al. .......... 345/173 |
| 2011/0109590 | A1 * | 5/2011 | Park .............................. 345/174 |

* cited by examiner

*Primary Examiner* — Lun-Yi Lao
*Assistant Examiner* — Tom Sheng
(74) *Attorney, Agent, or Firm* — Bacon & Thomas, PLLC

(57) ABSTRACT

A resistive touch panel has a lower panel module and an upper panel module, an adhesive layer, a separating layer and a flexible circuit board. The lower panel module has a substrate, a lower conducting layer and a plurality of electrodes. The upper panel module has a protective film, an upper conducting layer, a pattern layer, an ink electrode mounted to electrically connect with the flexible circuit board, and an insulation layer. One end of the flexible circuit board and the separating layer are sandwiched between the top surface of the lower conducting layer and the top surface of the upper conducting layer. Given the foregoing structure, the components and steps for fabricating the resistive touch panel can be reduced since the pattern layer is directly printed on the bottom surface of the upper conducting layer. Therefore, fabricating yields are increased.

10 Claims, 6 Drawing Sheets

RESISTIVE TOUCH PANEL

BACKGROUND OF THE INVENTION

1. Field of the Invention

The present invention relates to a resistive touch panel, and more particularly to a panel structure facilitating assembly and enhancing yield of a resistive touch panel.

2. Description of the Related Art

Recent technology trends have been toward touch screen devices using touch panels, which are either resistive touch panels or capacitive touch panels. The resistive touch panel for an electronic device, as shown in FIG. 6 and FIG. 7, has a bottom panel, a top panel, a first adhesive layer (904), a separating layer (905), a flexible circuit board (903), a solid film (92), a second adhesive layer (921) and a pattern layer.

The separating layer (905) and one end of the flexible circuit board (903) are sandwiched between the bottom and top panels by the first adhesive layer (904).

The bottom panel has a substrate (90), a lower conducting layer (901) and a plurality of first electrodes (902). The lower conducting layer (901) is formed on a top surface of the substrate (90). The first electrodes (902) are mounted on edges of a top surface of the lower conducting layer (901) and electronically connected with the end of the flexible circuit board (903) that is used to connect with an external control circuit inside the electronic device.

The top panel has a protective film (91), an upper conducting layer (911), a plurality of second electrodes (912) and an insulation layer (913). The upper conducting layer (911) is formed on a bottom surface of the protective film (91). The second electrodes (912) are mounted on edges of a bottom surface of the upper conducting layer (911) and electrically connect with the end of the flexible circuit board (903). The insulation layer (913) is mounted on the second electrode (912) and underneath the bottom surface of the upper conducting layer (911).

For some specific applications of the electronic device, the touch panel has patterns directly added thereon to mark functions of the applications. Therefore, a user can touch the functional patterns on the touch panel to start the corresponding functions of the electronic device. To achieve this objective, the printing ink layer is used. The functional patterns are printed on a bottom surface of the solid film (92), and the solid film (92) is mounted on a top surface of the protective film (91) by the second adhesive layer (921).

However, air bubbles are easily generated between the solid film (92) and the protective film (91) of the top panel when the solid film (92) is adhered to the second adhesive layer (921) on the top panel. Therefore, an uneven surface of the resistive touch panel easily occurs and further affects the operating performance of the resistive touch panel. Once the uneven issue occurs, the defective goods must be rejected causing an increase in production cost. Therefore, the structure of the resistive touch panel needs to be further refined.

SUMMARY OF THE INVENTION

The main objective of the present invention is to provide a resistive touch panel, which gets rid off the mounting of the solid film and eliminates the fabricating step for bonding with the solid film, thereby improving yield of the resistive touch panel.

To achieve the foregoing objective, the aforementioned resistive touch panel has a lower panel module, an upper panel module, an adhesive layer, a separating layer and a flexible circuit board.

The lower panel module has a substrate, a lower conducting layer and a plurality of electrodes. The substrate has a top surface. The lower conducting layer is formed on the top surface of the substrate and has a top surface. The electrodes are mounted on edges of the top surface of the lower conducting layer.

The upper panel module adhered to the lower panel module has a protective film, an upper conducting layer, a pattern layer, an ink electrode and an insulation layer. The protective film has a bottom surface. The upper conducting layer is formed on the bottom surface of the protective film and has a bottom surface. The pattern layer is printed on the bottom surface of the upper conducting layer and has a bottom surface. The ink electrode is mounted on edges of the bottom surface of the upper conducting layer. The insulation layer is formed on the bottom surface of the upper conducting layer to cover and isolate the ink electrode. The flexible circuit board has two ends, one of which is electronically connected with the electrodes of the upper and lower conducting layers. The separating layer is formed between the top surface of the lower conducting layer and the lower surface of the upper conducting layer.

A resistive touch panel is formed by bonding the upper panel module and the lower panel module. Such structure can effectively reduce component quantity of the touch panel. As such, production costs are lowered to improve competitive edge in the market. Moreover, steps for fabricating the resistive touch panel can be further simplified to enhance yield.

Other objectives, advantages and novel features of the invention will become more apparent from the following detailed description when taken in conjunction with the accompanying drawings.

DETAILED DESCRIPTION OF THE INVENTION

Figure 1:
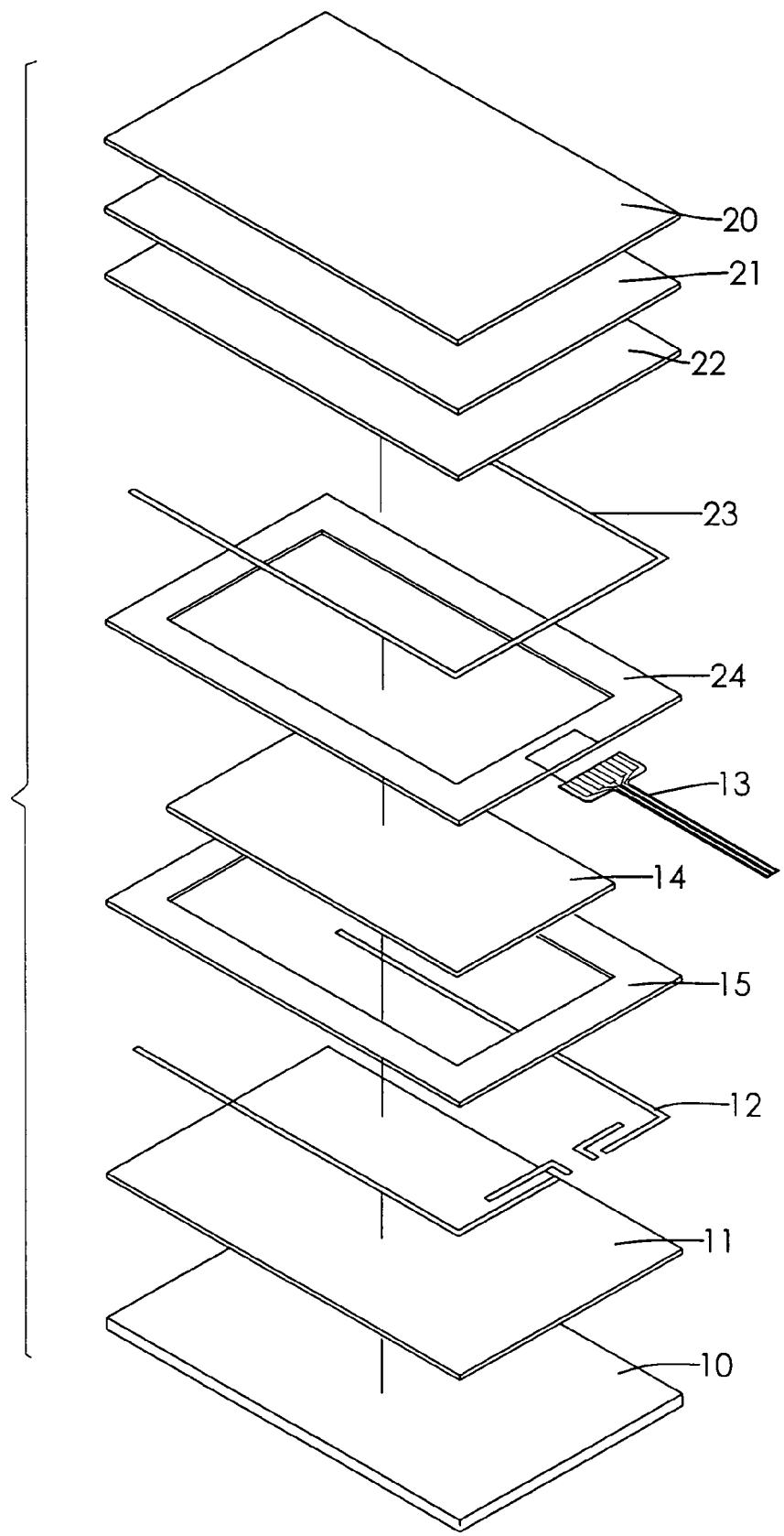
FIG. 1 is an exploded view of a first preferred embodiment of a resistive touch panel in accordance with the present invention.
Figure 2:
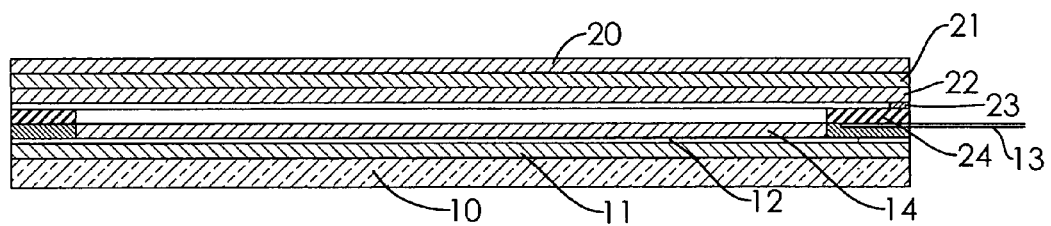
FIG. 2 is a cross-sectional view in FIG. 1.

With reference to FIG. 1 and FIG. 2, a resistive touch panel in accordance with the present invention has an upper panel module, a lower panel module, an adhesive layer (15), a separating layer (14) and a flexible circuit board (13).

The lower panel module is mounted on the upper panel module through the adhesive layer (15). The lower panel module has a substrate (10), a lower conducting layer (11) and a plurality of electrodes (12). The substrate (10) is transparent and has a top surface. The lower conducting layer (11) is formed on the top surface of the substrate (10). The electrodes (12) are mounted on edges of a top surface of the lower conducting layer (11). The flexible circuit board (13) has a plurality of terminals. One end of each of the terminals of the flexible circuit board (13) is electronically connected with the corresponding electrode (12) of the lower conducting layer (11), and the other end of each of the terminals of the flexible circuit board (13) is connected with an external control circuit of an electronic device. The separating layer (14) is formed on the top surface of the lower conducting layer (11). In this embodiment, the substrate is a glass board.

The upper panel module has a protective film (20), an upper conducting layer (21), a pattern layer (22), an ink electrode (23) and an insulation layer (24). The protective film (20) has a bottom surface. The upper conducting layer (21) is formed on the bottom surface of the protective film (20). The upper conducting layer (21) is contacted with the separating layer (14) above the lower conducting layer (11) of the lower panel module. A voltage change is generated between the lower conducting layer (21) of the lower panel module and the upper conducting layer (21) of the upper panel module during the operation of the resistive touch panel. The pattern layer (22) is printed by printing ink material on a bottom surface of the upper conducting layer (21). The ink electrode (23) is mounted on edges of the bottom surface of the upper conducting layer (21) to electrically connect with the end of the flexible circuit board (13). The insulation layer (24) is formed on the bottom surface of the upper conducting layer (21) to cover the ink electrode (23) and isolate the upper panel module from the lower panel module.

The aforementioned upper and lower conducting layers (21, 11) are composed of ITO transparent electrode, and the ink electrode (23) is a combination of a printing ink and conducting particles.

A detailed electric connection among the flexible circuit board (13), the upper panel module and the lower panel module is further described as follows.

Figure 3:
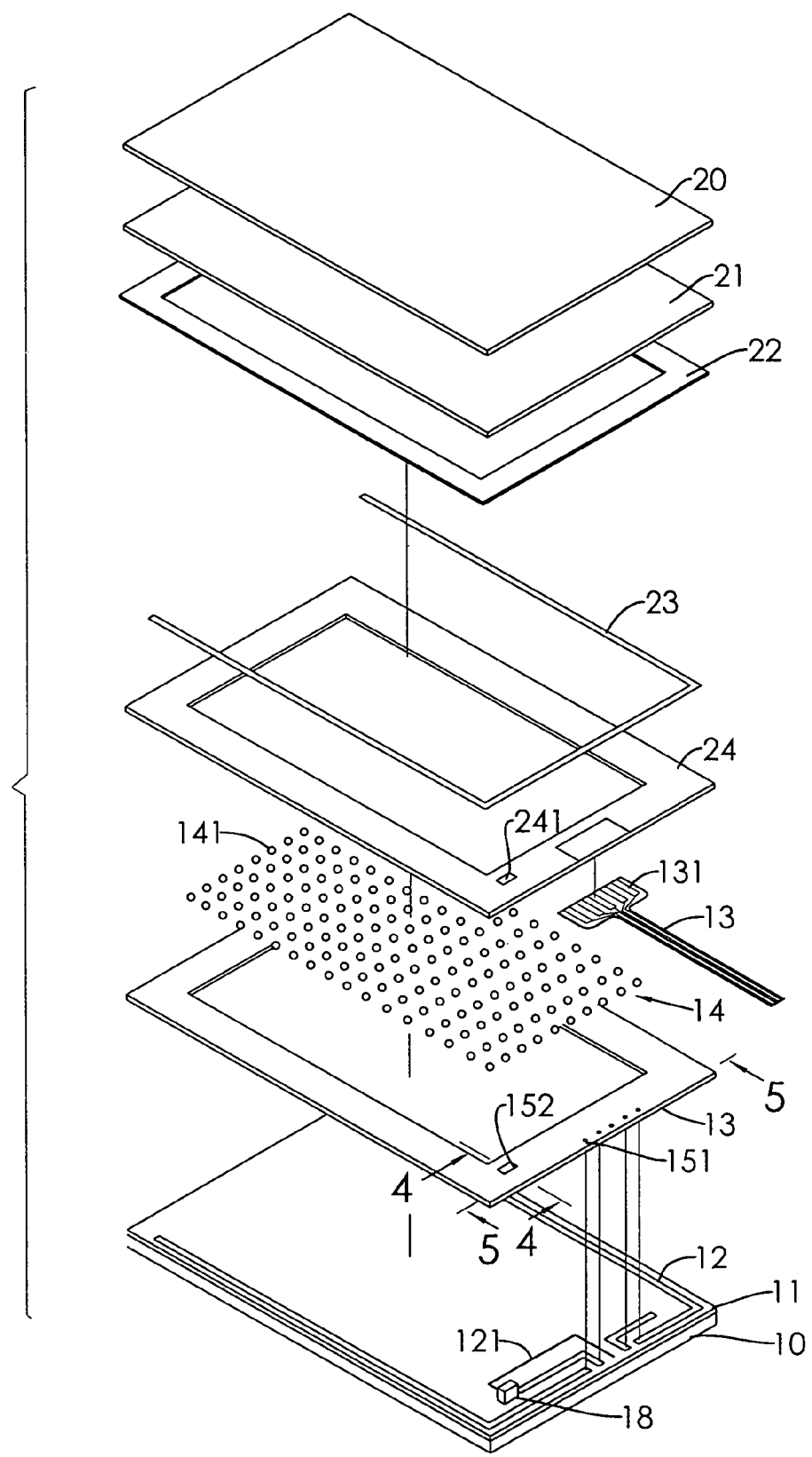
FIG. 3 is an exploded view of a second preferred embodiment of a resistive touch panel in accordance with the present invention.
Figure 4:
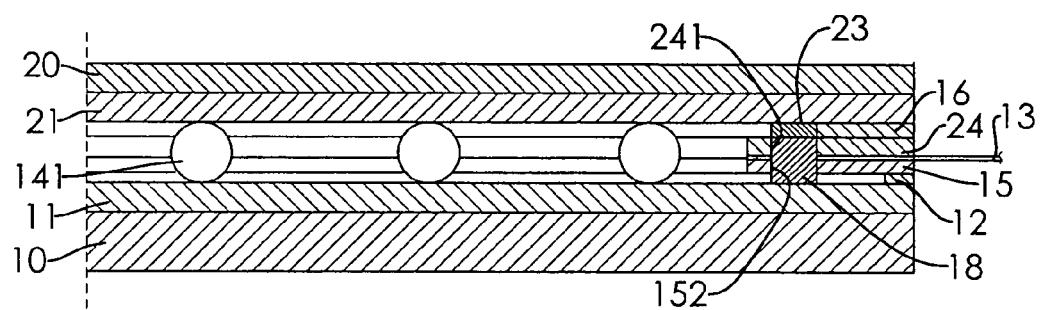
FIG. 4 is a cross-sectional view along line 4-4 in FIG. 3.
Figure 5:
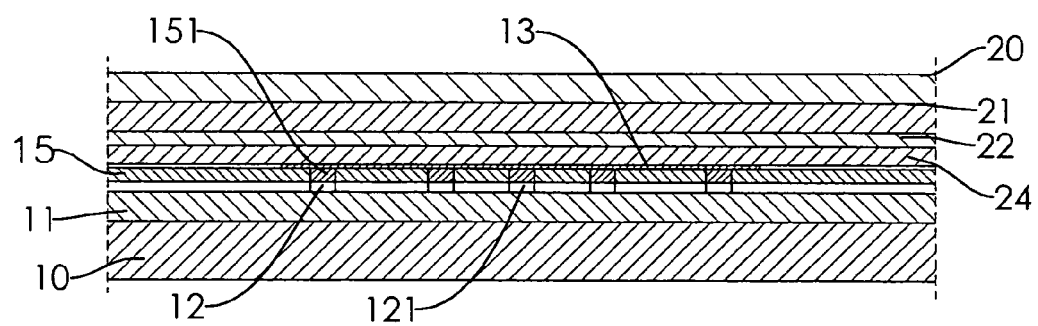
FIG. 5 is a cross-sectional view along line 5-5 in FIG. 3.
Figure 6:
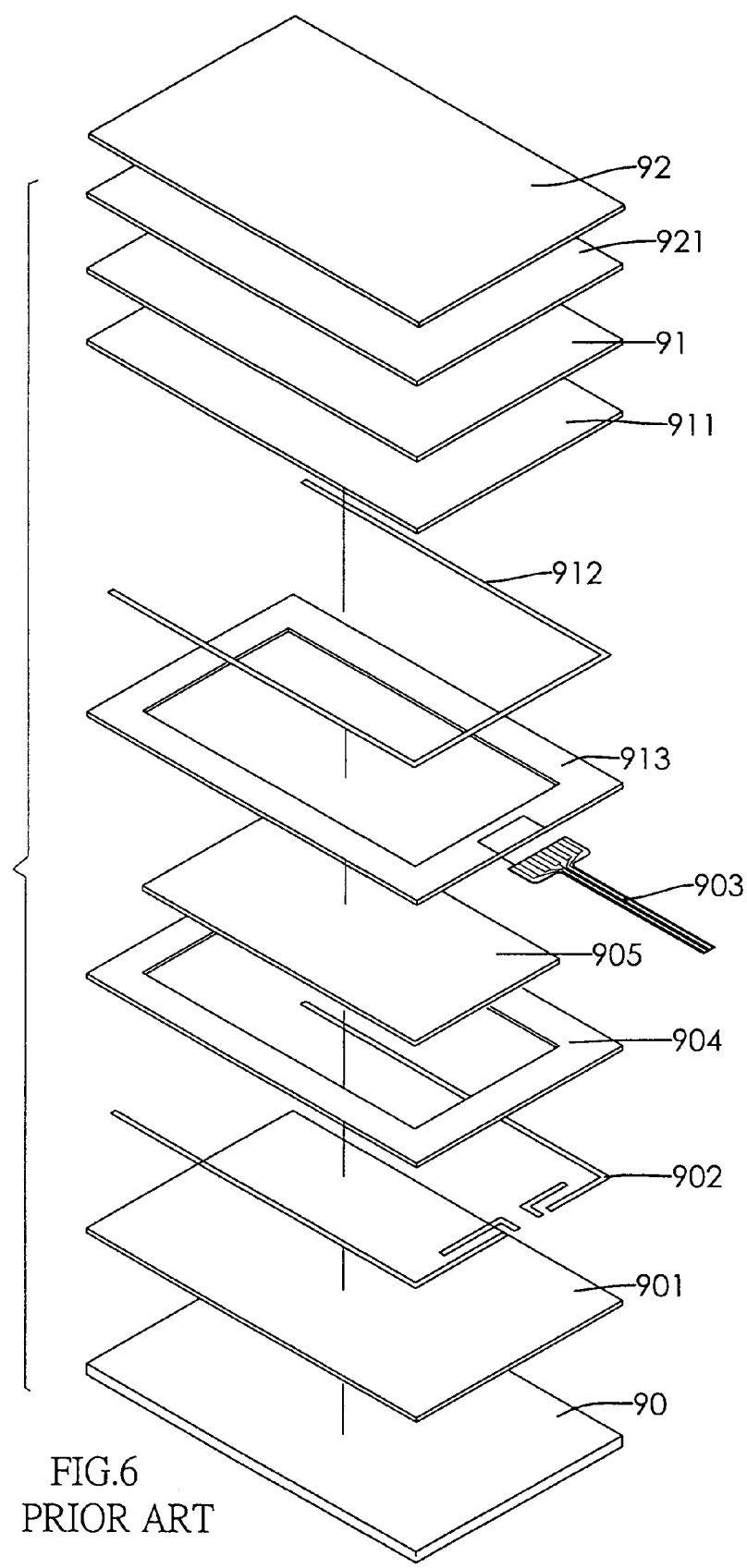
FIG. 6 is an exploded view of a conventional resistive touch panel.
Figure 7:
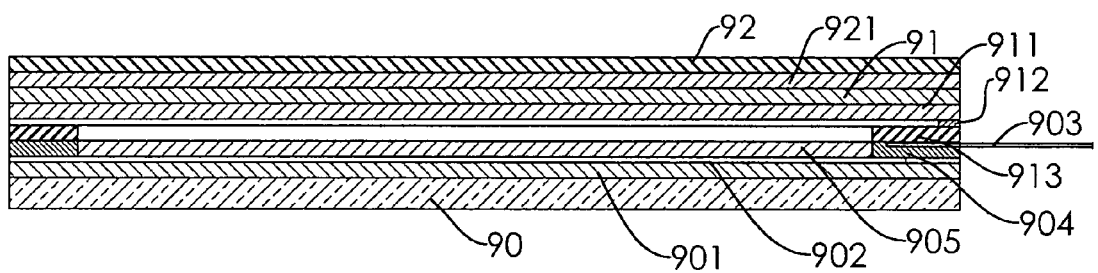
FIG. 7 is a cross-sectional view of the conventional resistive touch panel in FIG. 6.

With reference to FIGS. 3 to 5, a second embodiment of a resistive touch panel in accordance with the present invention is similar to the first embodiment thereof. The end of the flexible circuit board (13) is mounted between the upper and lower panel modules and has multiple terminals (131) formed at a bottom of the flexible circuit board (13).

In the second embodiment, the lower panel module has one leading line (121) formed on the lower conducting layer (11) and separated from the electrodes (12) on the lower conducting layer (11). One end of the leading line (121) is aligned to one of the terminals (131) of the flexible circuit board (13). A conductor (18) is formed at the other end of the leading line (121).

The adhesive layer (15) is formed around the separating layer (14). In the second embodiment, the adhesive layer (15) further has a first through hole (152) aligned to the conductor (18) and receiving the conductor (18) therein, and multiple conductive glues (151) respectively aligned to other terminals (131) of the flexible circuit board (13).

The insulation layer (24) further has a second through hole (241) aligned to the first through hole (152) of the adhesive layer (15) to receive the conductor (18) therein. The conductor (18) is connected between the leading line (121) and the ink electrode (23), so the ink electrode (23) is electronically connected to the corresponding terminal (131) of the flexible circuit board (13) through the conductor (18) and the leading line (121) when the lower and upper panel modules are combined through the adhesive layer.

When the protective film (20) is touched by a finger or stylus, the protective film will sink and the upper conducting layer (21) of the upper panel module contacts with the lower conducting layer (11) of the lower panel module. Therefore, A voltage between the lower conducting layer (11) of the lower panel module is generated according to a sinking location and then output to the external control circuit of the electronic device. The electronic device than obtains one set of coordinates according to the voltage and executes a corresponding function. Based on the foregoing description, the resistive touch panel in accordance with the present invention does not require a solid film and another adhering procedure, since the pattern layer made of the printing ink is directly printed on the bottom surface of the upper conducting layer. Consequently, steps of fabricating the resistive touch panel can be simplified and the production cost can be reduced. Besides, the present invention can provide better flatness to improve the yield.

Furthermore, the resistive touch panel can achieve another objective of being light and thin so as to comply with demands of portability. By eliminating the mounting of the solid film, the pressing force of user on the resistive touch panel can be further alleviated, thereby facilitating responsiveness to touch.

In sum, the resistive touch panel of the present invention has no solid film, thus does not suffer from air bubbles generated when bonding the adhesive layer to the solid film and the protective film of a conventional resistive touch panel, and further reduces the component quantity, assembly time and associated labor costs.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A resistive touch panel, comprising:
    a lower panel module comprising:
        a substrate having a top surface;
        a lower conducting layer formed on the top surface of the substrate and having a top surface; and
        a plurality of electrodes mounted on edges of the top surface of the lower conducting layer;
    an upper panel module adhered to the lower panel module comprising:
        a protective film having a bottom surface;
        an upper conducting layer formed on the bottom surface of the protective film and having a bottom surface;
        a pattern layer printed on the bottom surface of the upper conducting layer and having a bottom surface;
        an ink electrode mounted on edges of the bottom surface of the upper conducting layer; and
        an insulation layer formed on the bottom surface of the upper conducting layer to cover and isolate the ink electrode;
    a flexible circuit board having two ends, one of which is electronically connected with the electrodes of the upper and lower conducting layers; and
    a separating layer formed between the top surface of the lower conducting layer and the lower surface of the upper conducting layer.

2. The resistive touch panel as claimed in claim 1, wherein the substrate is a glass board.

3. The resistive touch panel as claimed in claim 2, wherein the ink electrode is combination of a printing ink and conducting particles.

4. The resistive touch panel as claimed in claim 3, wherein each of the lower conducting layer and the upper conducting layer are transparent electrodes.

5. The resistive touch panel as claimed in claim 4, wherein the flexible circuit board has multiple terminals formed at a bottom thereof;

one leading line is formed on the lower conducting layer;
one end of the leading line is aligned to one of the terminals of the flexible circuit board;
a conductor is formed at the other end of the leading line;
the adhesive layer further has a first through hole aligned to the conductor and receiving the conductor therein;
multiple conductive glues are respectively aligned to other terminals of the flexible circuit board;
the insulation layer further has a second through hole aligned to the first through hole of the adhesive layer to receive the conductor therein; and
the ink electrode is electronically connected to the corresponding terminal of the flexible circuit board through the conductor and the leading line.

6. The resistive touch panel as claimed in claim 3, wherein the flexible circuit board has multiple terminals formed at a bottom thereof;
one leading line is formed on the lower conducting layer;
one end of the leading line is aligned to one of the terminals of the flexible circuit board;
a conductor is formed at the other end of the leading line;
the adhesive layer further has a first through hole aligned to the conductor and receiving the conductor therein;
multiple conductive glues are respectively aligned to other terminals of the flexible circuit board;
the insulation layer further has a second through hole aligned to the first through hole of the adhesive layer to receive the conductor therein; and
the ink electrode is electronically connected to the corresponding terminal of the flexible circuit board through the conductor and the leading line.

7. The resistive touch panel as claimed in claim 1, wherein the ink electrode is combination of a printing ink and conducting particles.

8. The resistive touch panel as claimed in claim 7, wherein each of the lower conducting layer and the upper conducting layer are transparent electrodes.

9. The resistive touch panel as claimed in claim 8, wherein the flexible circuit board has multiple terminals formed at a bottom thereof;
one leading line is formed on the lower conducting layer;
one end of the leading line is aligned to one of the terminals of the flexible circuit board;
a conductor is formed at the other end of the leading line;
the adhesive layer further has a first through hole aligned to the conductor and receiving the conductor therein;
multiple conductive glues are respectively aligned to other terminals of the flexible circuit board;
the insulation layer further has a second through hole aligned to the first through hole of the adhesive layer to receive the conductor therein; and
the ink electrode is electronically connected to the corresponding terminal of the flexible circuit board through the conductor and the leading line.

10. The resistive touch panel as claimed in claim 7, wherein the flexible circuit board has multiple terminals formed at a bottom thereof;
one leading line is formed on the lower conducting layer, one end of the leading line is aligned to one of the terminals of the flexible circuit board;
a conductor is formed at the other end of the leading line;
the adhesive layer further has a first through hole aligned to the conductor and receiving the conductor therein;
multiple conductive glues are respectively aligned to other terminals of the flexible circuit board;
the insulation layer further has a second through hole aligned to the first through hole of the adhesive layer to receive the conductor therein; and
the ink electrode is electronically connected to the corresponding terminal of the flexible circuit board through the conductor and the leading line.

* * * * *